Sept. 19, 1950 J. M. DODWELL 2,522,503
DISENGAGEABLE BELT DRIVE
Filed Jan. 28, 1946 3 Sheets-Sheet 1

Inventor
JOHN M. DODWELL

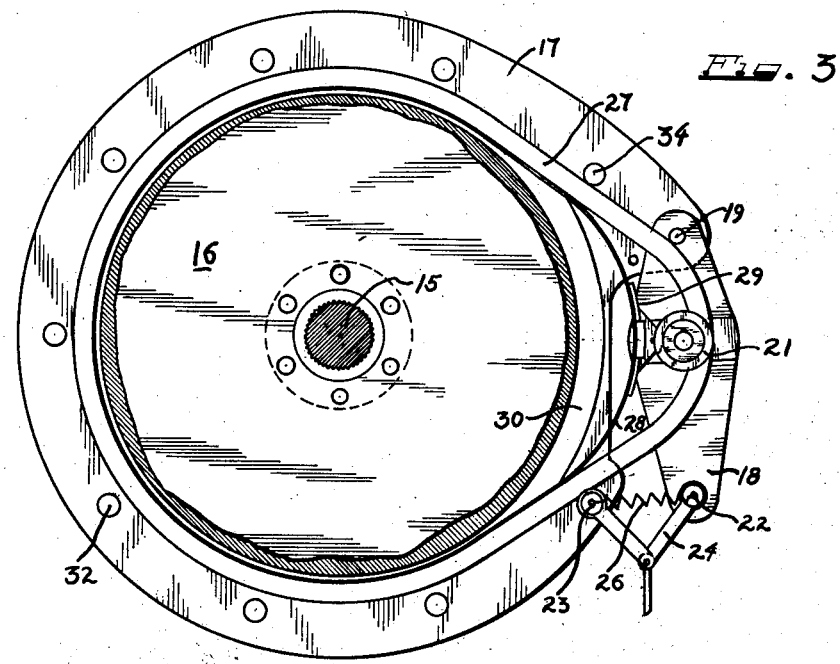
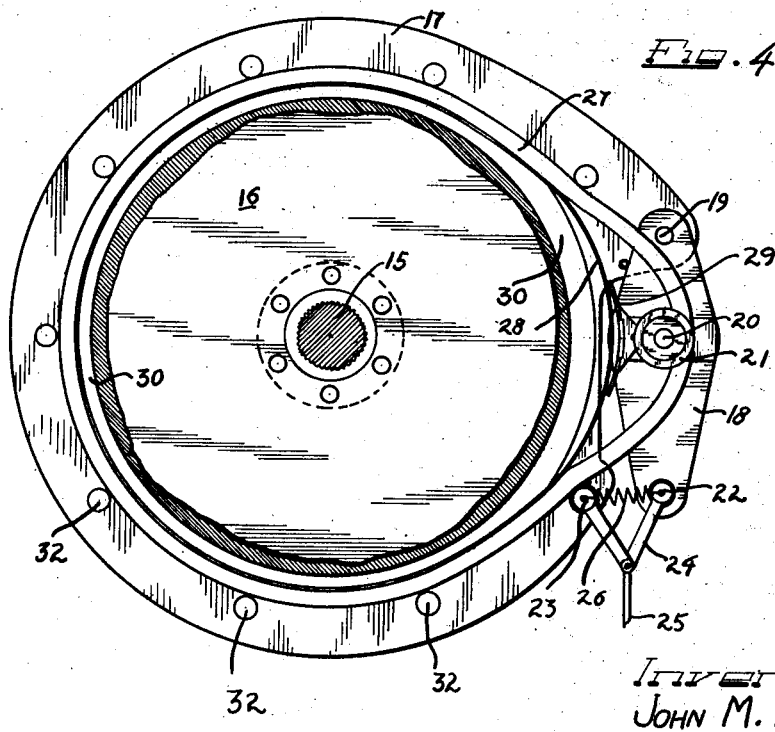

Sept. 19, 1950  J. M. DODWELL  2,522,503
DISENGAGEABLE BELT DRIVE
Filed Jan. 28, 1946  3 Sheets-Sheet 3
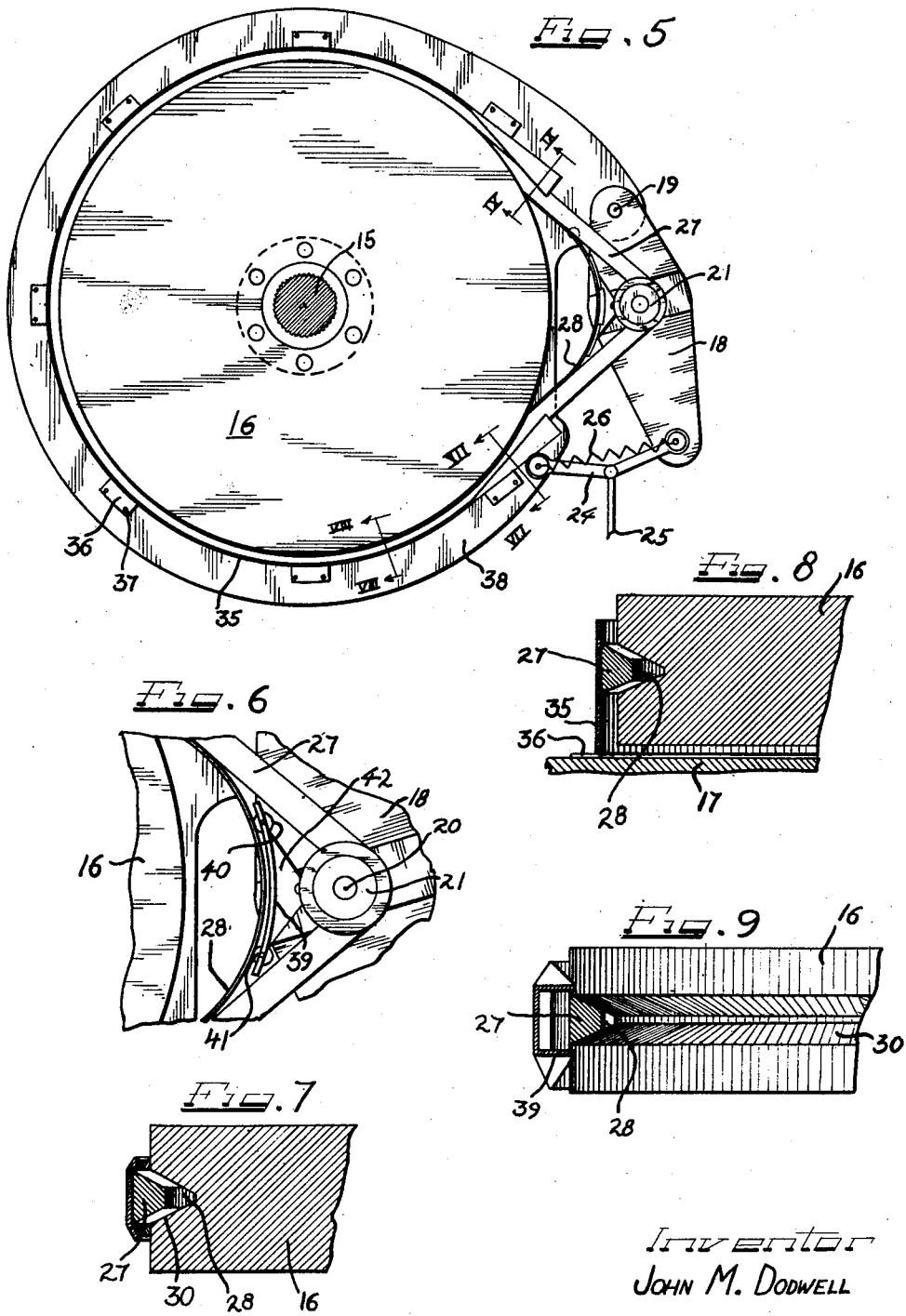
Inventor
John M. Dodwell Patented Sept. 19, 1950

2,522,503

UNITED STATES PATENT OFFICE 2,522,503

DISENGAGEABLE BELT DRIVE

John M. Dodwell, Shawbridge, Quebec, Canada

Application January 28, 1946, Serial No. 643,899

13 Claims. (Cl. 74—6)

The present invention relates to a disengageable belt drive and more particularly to a V-belt drive between two rotatable members or pulleys, one of which rotates for only a part of the time the other rotates, and has to do with ways and means for maintaining the belt adjacent but disengaged from the rotating member or pulley.

The invention as herein shown and described has V-belt drive means between the starting motor and flywheel of an engine, e. g. internal combustion engine, Diesel engine, or the like, for starting the engine.

An object of the present invention is to provide a belt drive between the starting motor and flywheel of a prime mover, such as an internal combustion engine or Diesel engine.

Another object of the present invention is to provide a belt drive between the starting motor and flywheel of a prime mover including means for disengaging the belt from the flywheel as the prime mover operates.

A further object of the present invention is to provide a belt drive between the starting motor and flywheel of a prime mover in which means are provided for lifting the belt away from the flywheel as the prime mover operates, and supporting the belt ready for subsequent engagement with the flywheel for a subsequent starting operation.

A still further object of the present invention is to provide a V-belt drive between the starting motor and flywheel of an engine for starting the engine and which drive includes means for disengaging the belt from the flywheel after the engine starts.

Another and yet further object of the present invention is to provide a V-belt drive for connection between the starting motor and flywheel of an engine with the starting motor mounted to swing to tighten and loosen the belt, and in the provision of spring means for radially disengaging the belt from driving engagement with the flywheel when the belt is loose.

The invention has for an additional object the provision of a V-belt drive means between two pulleys, one of which is non-rotatable for periods of time while the other is rotating, and which drive includes means for disengaging the belt from the rotating pulley to save the belt from unnecessary wear and loss of power from belt drag.

The above, other and further objects of the present invention will be apparent from the following description and accompanying drawings.

The accompanying drawings, somewhat schematic in character, illustrate embodiments of the present invention and the views thereof are as follows.

On the drawings:

Figure 3 is a view similar to Fig. 1, showing a portion of the flywheel broken away and illustrating the disposition of the spring band and belt in the flywheel groove, and showing the relationship of the parts as the belt is initially loosened after the engine is started.

Figure 4 is a view similar to Fig. 3 showing the relationship of the parts when the belt is in its maximum disengaged position as the flywheel is rotating with the crank shaft.

Figure 5 is a view similar to Fig. 1, showing a modified form of guide means for the belt, and showing a modified guide for the spring band.

Figure 6 is an enlarged elevational view of the modified guide for the spring band, of Fig. 5, showing the parts with the belt taut.

Figure 7 is an enlarged sectional view taken in the plane of line VII—VII of Fig. 5, showing the engagement of the loose belt with the guide.

Figure 8 is a fragmental sectional view taken in the plane of line VIII—VIII of Fig. 5, showing the loose belt held against the guide by action of the spring band.

Figure 9 is an enlarged sectional view taken in the plane of line IX—IX of Fig. 5, showing the relationship of the spring band and belt with respect to the pulley groove when the belt is in driving engagement with the pulley and showing the relationship between the belt and the canopy end of the belt guide of Fig. 5.

The drawings will now be explained.

Figure 1:
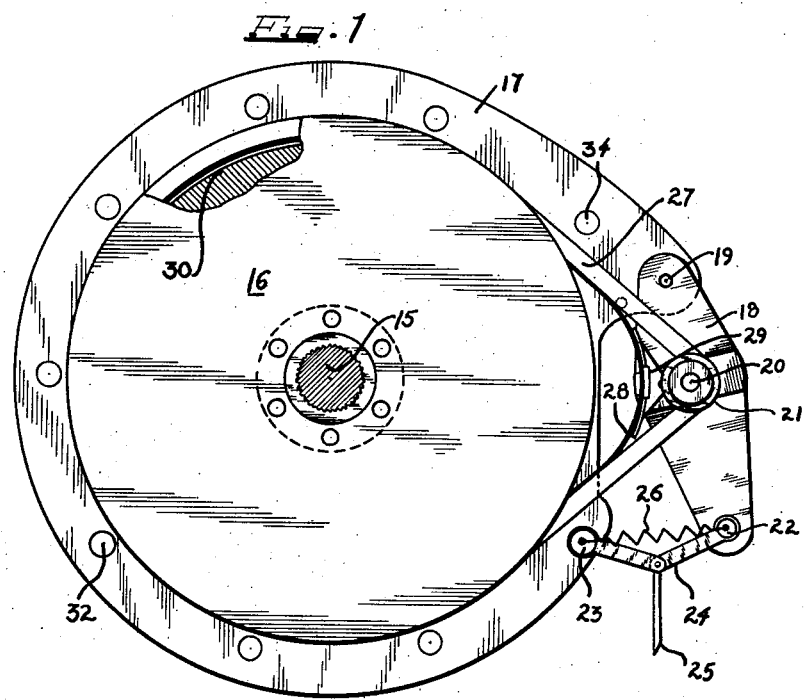
Figure 1 is an elevational view of the flywheel of an engine, parts being shown in section, a part broken away to show the V-groove in the flywheel, and the position of the parts when the driving belt between the starting motor and flywheel is taut for turning over the flywheel to start the engine.
Figure 2:
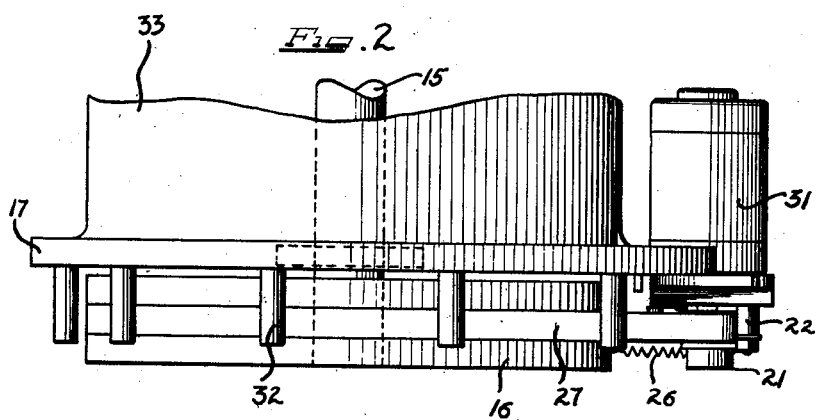
Figure 2 is a fragmental top plan view of the arrangement of Fig. 1, showing relationship of certain parts.

As shown on the drawings:

Referring to Figs. 1 and 2, 15 designates the crank shaft of an engine, such as an internal combustion engine, or Diesel engine, or the like, to which is secured a fly wheel 16 in the usual manner. The periphery of the fly wheel is provided with a V-shaped groove 30. A flange 17 forming a part of the engine casing 33 is arranged adjacent the periphery of the fly wheel 16.

Pivoted at 19 to the flange 17 is a swinging plate 18 which intermediate its length is provided with a bearing for the shaft 20 of a starting motor 31 which motor is suitably secured to the plate 18 to swing with it. A pulley 21 is keyed or otherwise attached to the shaft 20.

A V-belt 27 is applied to the V-groove 30 of the fly wheel 16 and the V-groove in the pulley 21.

Inwardly of the belt 27 is a spring band 28, which is endless and of narrow width and which is interposed between the belt 27 and the bottom of the groove 30 in the flywheel 16. The length of the spring band 28 is slightly less than the length of the V-belt 27.

As may be observed, the lengths of the belt 27 and the spring band 28 are greater than the diameter of the flywheel, the length of the V-belt being such as to pass over the pulley 21 on the motor shaft 20. In order to prevent the spring band 28 from contacting the pulley 21, as the starting motor is operated, a guide 29 is pivoted to the plate 18. This guide is arcuate in elevation, as may be observed in Fig. 1 against the concave face of which the bight of the spring band 28 not quite engages as the belt 27 is taut and the starting motor is actuated to turn over the flywheel 16. It will thus be noted that with the belt 27 taut and the starting motor operating to turn over the flywheel 16, the spring band 28 will be engaged between the bottom of the belt 27 and the groove 30 of the flywheel to move with the belt. The bight of the band does not quite bear against the guide 29 as long as the belt moves while it is taut.

The plate 18 is swung back and forth about its pivot 19, by means of a toggle, designated generally at 24, the end of one leg being connected to the plate 18 by a post 22 and the end of the other leg being connected to the flange 17 by a post 23. A pull rod 25 is connected to the pivotal connection of the legs of the toggle and is adapted to be actuated manually or by some mechanical means such as a solenoid, etc. A spring 26 is connected between the posts 23 and 22 to swing the plate 18 to the left, as viewed in the drawings, when the toggle is moved downwardly from the position shown in Fig. 1.

After the engine is started, by the starting motor 31 driving through the belt 27, the toggle is released from the position shown in Fig. 1, whereupon the plate 18 swings to the left, as viewed in Figs. 1, 3 and 4, under the influence of the spring 26. Initiation of this movement loosens the belt 27 and moves the guide 29 to the left which exerts a push against the bight of the spring band 28, tending to flatten the bight.

The post 23 and another post 34 are so disposed with respect to the tangents between the flywheel 16 and the pulley 21 as to lie outside of the tangents a slight distance so that when the bight of the band 28 is flattened it will push the belt 27 against these posts with the result that the spring band is kicked to the left as viewed in the drawings, thus displacing the belt 27 radially from driving engagement with the walls of the groove 30 in the flywheel. As the spring 26 moves the plate 18 to fully released position, which is that shown in Fig. 4, the spring band 28 will have kicked the belt 27 farther away from the bottom of the groove 30 in the flywheel, as may be observed in Figure 4.

In order to prevent displacement of the belt 27 beyond a desirable amount, that is to say, beyond a point where it might escape from the groove 30 of the flywheel, stops 32 are inserted in the flange 17 about the flywheel, as may be observed in Fig. 1, at suitable intervals. As the belt 27 is kicked outwardly by the spring band 28, to the position shown in Fig. 4, the outer surface of the belt will engage or contact these stops and come to rest. Pressure of the guide 29 on the plate 18 against the spring band 28 maintains the band expanded to its maximum extent, so that it holds the belt against the stops 32 as long as the flywheel 16 rotates or until a subsequent starting operation is desired.

Fig. 4 illustrates the position of the spring band 28 when the belt 27 is in fully released position and shows the band slightly tensioned by the pressure of the guide 29 thereagainst to distort the band sufficiently to assure its holding the belt 27 away from driving engagement with the groove 30 of the flywheel.

Referring to Fig. 5, a different form of guide for the belt 27 is there shown. The guide comprises a length of flat metal 35 arranged edgewise as shown in Figs. 5 and 8, being supported in that position at intervals by means of lugs 36 struck out from the bottom of the strip, which lugs are fastened by rivets or the like 37 to the flange 38 about the flywheel. The ends of the guide strip 35 are bent over to form hoods 39, as may be readily observed in Fig. 9. The hoods have wall portions to receive the belt and prevent its accidental displacement from the groove 30 of the flywheel 16. This form of guide is so disposed about the periphery of the flywheel 16 as to allow the displacement of the belt 27, when in fully released position, to substantially that shown in Fig. 4, the outer surface of the belt bearing against the inner face of the guide 35, as is illustrated in Fig. 8. It will be observed from Fig. 9, that when the belt is released, its side margins will be received within the hood 39 of the terminal ends of the guide.

Referring to Figs. 5 and 6, a different form of guide 39 for the bight of the spring band 28 is shown. The guide 39 has an upstanding arcuate portion carrying rollers 40 and 41 against which the bight of the band 28 does not quite engage when the belt 27 is taut for starting the engine. This form of guide is suitably secured to the plate 18 by a wing 42, as the wing is so secured that the guide may swing as the plate 18 is swung back and forth between its extreme positions, that is to say, the positions shown in Figs. 3, 5, 6 and 4.

The guide 29, like the guide 39, is mounted to have limited swinging movement on the plate 18 to follow the configuration of the bight of the band 28.

It will be observed that the present invention makes it possible to utilize a V-belt for connecting the starting motor to an engine, for starting the latter, and to disengage the belt from driving relation with the flywheel after the engine starts and the starting motor is moved to idle or disengaged position. The belt is disengaged from driving relation with the flywheel and maintained in disengaged position but retained in such manner as to quickly engage the groove in the flywheel when a subsequent starting operation is desired.

It will be noted that the provision of the spring band is sufficient to kick the belt away from its driving relation with the flywheel when the belt is loosened. There is sufficient resiliency in the spring band to engage the belt over a greater portion of its length to hold it against the stop means when loosened, thus assuring disengagement of the belt with respect to the flywheel.

The bight formed in the band 28, when the belt 27 is taut, is put under tension by contact with the guide or abutment 29 or 39, the bight being slightly flattened. Thus when the belt is eased, the flattened bight, tends to assume an expanded position, engaging the stops 23 and 34 as fulcra with the result that the band kicks the belt out of contact with the walls of the groove 30.

The construction is simple, efficient, and positive in operation.

It is to be understood that, while the invention has herein been illustrated and described as pertaining to V-belts, it is not limited to such construction, as the same principle may be employed with flat type belts. To accommodate the spring band about a flat belt pulley, a circumferential groove would be cut in the pulley face to take the band without too much top and side clearance but of such character as would avoid formation of edges as might score the belt. The operation would then be exactly the same as that herein described as relating to V-belts.

The present invention would be useful where it is desired to disengage a belt from both driving and driven pulleys where the pulleys continue to operate at different or varying relative speeds and connection between them is temporarily undesired. The belt could be lifted from both pulleys by use of a spring band over both pulleys by forming bulges in the band by independent shoes.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. Means for connecting a starting motor to the flywheel of an engine for starting the latter, comprising a V-belt, means effective to tension the belt to establish driving connection between the starting motor and flywheel, and means effective after the engine starts to loosen the belt and disconnect it from driving relation with the flywheel, without wholly removing it from the flywheel, and a spring band underneath the belt effective after the engine starts to disconnect the belt from driving engagement with the flywheel.

2. In combination, an internal combustion engine having a flywheel with a V-groove in it, a starting motor having a pulley with a V-groove in it, a V-belt over said pulley and flywheel, a mounting for said starting motor, means to move the motor mounting in one direction to tighten the belt, means to move the motor mounting in the opposite direction to loosen the belt, and means operable by movement of said motor mounting in said opposite direction to disengage the V-belt from frictional contact with the flywheel, and means preventing displacement of the belt with respect to the grooves.

3. In combination, an engine having a flywheel and a starting motor for starting the engine, said flywheel having a V-groove in it, said starting motor having a pulley with a V-groove in it, a V-belt in said grooves, means to tighten the belt, means to loosen the belt, and a spring band underlying the belt in the flywheel groove operable by the belt loosening means to disengage the belt from driving relation with the flywheel.

4. In combination, an engine having a flywheel and a starting motor for starting the engine, said flywheel having a V-groove in it, said starting motor having a pulley with a V-groove in it, a V-belt in said grooves, means to tighten the belt, means to loosen the belt, and a spring band underlying the belt in the flywheel groove, and means operable as belt loosened to spread the band to radially disengage said belt from driving engagement with the flywheel.

5. In combination, an engine having a flywheel and a starting motor for starting the engine, said flywheel having a V-groove in it, said starting motor having a pulley with a V-groove in it, a V-belt in said grooves, means to tighten the belt, means to loosen the belt, and a spring band underlying the belt in the flywheel groove, and means operable as belt loosened to spread the band to radially disengage said belt from driving engagement with the flywheel and a backing guide to limit outward radial movement of said belt by said band.

6. In combination, an internal combustion engine having a flywheel with a V-groove in it, a starting motor having a pulley with a V-groove in it, a V-belt over said pulley and flywheel, a mounting for said starting motor, means to move the motor mounting in one direction to tighten the belt, means to move the motor mounting in the opposite direction to loosen the belt, and means springing said belt away from driving engagement with the flywheel when the motor mounting is moved to loosen said belt.

7. In combination, an internal combustion engine having a flywheel with a V-groove in it, a starting motor having a pulley with a V-groove in it, a V-belt over said pulley and flywheel, a mounting for said starting motor, means to move the motor mounting in one direction to tighten the belt, means to move the motor mounting in the opposite direction to loosen the belt, and means springing said belt away from driving engagement with the flywheel when the motor mounting is moved to loosen said belt, said last means acting through approximately 360°.

8. In combination, an internal combustion engine having a flywheel with a V-groove in it, a starting motor having a pulley with a V-groove in it, a V-belt over said pulley and flywheel, a mounting for said starting motor, means to move the motor mounting in one direction to tighten the belt, means to move the motor mounting in opposite direction to loosen the belt, and endless spring band underlying said belt in the flywheel groove, the movement of the motor mounting to tighten said belt causing the formation of a bight in said band between the tangential runs of the taut belt from wheel to pulley, an abutment on the motor mounting to tension said band bight to cause band to kick belt away from driving engagement with flywheel groove when said belt is loosened.

9. In combination, an engine having a flywheel and a starting motor for starting the engine, said flywheel having a V-groove in it, said starting motor having a pulley with a V-groove in it, a V-belt in said grooves, toggle means to tighten the belt, spring means to loosen the belt, when the toggle is released, and a spring band underlying the belt in the flywheel groove operable by the belt loosening means to disengage the belt from driving relation with the flywheel.

10. In combination, an internal combustion engine having flywheel with a V-groove in it, a starting motor having a pulley with a V-groove in it, a V-belt over said pulley and flywheel, a mounting for said starting motor, means to move the motor mounting in one direction to tighten the belt, means to move the motor mounting in opposite direction to loosen the belt, an endless spring band underlying said belt in the flywheel groove, the movement of the motor mounting to tighten said belt causing the formation of a bight in said band between the tangential runs of the taut belt from wheel to pulley, an abutment on the motor mounting to tension said band bight, and stops adjacent the belt tangents to constitute fulcra for springing said band and belt away from the flywheel when the motor mounting is moved to loosen the belt and the said abutment tends to flatten the band bight.

11. In combination, a driving pulley and a driven pulley, belt means for connecting said pulleys in operative relation, and the face of one of said pulleys having a spring band receiving groove in it, a spring band in said groove underneath the belt, and means for bulging said band to cause it to lift the belt out of driving engagement with said one pulley.

12. In combination, a driving pulley and a driven pulley, belt means for connecting said pulleys in operative relation, a spring band about one of said pulleys between the belt and the pulley face, and means for loosening said belt including means for bulging said band to displace the belt radially from its pulley.

13. In combination a driving pulley and a driven pulley, a continuous driving band lapped about both of said pulleys and in operating contact therewith, a continuous resilient spring band lapped about one of said pulleys, said spring band being of greater diameter than said one pulley and having a portion thereof interposed between said one pulley and said driving band, and means for distorting that portion of said spring band lapped about said one pulley radially outwardly of the pulley to displace said driving band from operating contact with said one pulley.

JOHN M. DODWELL.

REFERENCES CITED

The following references are of record in the file of this patent:

UNITED STATES PATENTS

| Number | Name | Date |
|---|---|---|
| 429,877 | Anderson | June 10, 1890 |
| 1,116,970 | Apple | Nov. 10, 1914 |
| 1,259,744 | Hunt | Mar. 19, 1918 |